United States Patent
Delaney et al.

(10) Patent No.: US 10,714,144 B2
(45) Date of Patent: Jul. 14, 2020

(54) CORROBORATING VIDEO DATA WITH AUDIO DATA FROM VIDEO CONTENT TO CREATE SECTION TAGGING

(71) Applicant: INTERNATIONAL BUSINESS MACHINES CORPORATION, Armonk, NY (US)

(72) Inventors: Mark P. Delaney, Raleigh, NC (US); Robert H. Grant, Austin, TX (US); Trudy L. Hewitt, Cary, NC (US); Martin A. Oberhofer, Bondorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 15/804,062

(22) Filed: Nov. 6, 2017

(65) Prior Publication Data
US 2019/0139576 A1    May 9, 2019

(51) Int. Cl.
*G11B 27/10* (2006.01)
*G10L 25/57* (2013.01)
(Continued)

(52) U.S. Cl.
CPC .............. *G11B 27/10* (2013.01); *G06F 40/30* (2020.01); *G06K 9/00744* (2013.01); *G10L 25/57* (2013.01)

(58) Field of Classification Search
CPC ..... G11B 27/10; G06F 17/2785; G06F 40/30; G06K 9/00744; G10L 25/57
See application file for complete search history.

(56) References Cited

U.S. PATENT DOCUMENTS 6,219,640 B1 *  4/2001  Basu ................. G06K 9/00221
                                                              704/231
8,103,646 B2    1/2012  Brown
(Continued)

FOREIGN PATENT DOCUMENTS

WO    WO-2007038119 A2 *  4/2007  .............. G06N 5/02
WO    2007/056535          5/2007

OTHER PUBLICATIONS

Scott Ge, "Automatic Image and Video Tagging", http://scottge.net/2015/06/30/automatic-image-and-video-tagging/, accessed Nov. 8, 2017, 11 pages.

*Primary Examiner* — David E Harvey
(74) *Attorney, Agent, or Firm* — Brian Restauro; Andrew D. Wright; Roberts Calderon Safran & Cole, P.C.

(57) ABSTRACT

Systems and methods for tagging video content are disclosed. A method includes: receiving a video stream from a user computer device, the video stream including audio data and video data; determining a candidate audio tag based on analyzing the audio data; establishing an audio confidence score of the candidate audio tag based on the analyzing of the audio data; determining a candidate video tag based on analyzing the video data; establishing a video confidence score of the candidate video tag based on the analyzing of the video data; determining a correlation factor of the candidate audio tag relative to the candidate video tag; and assigning a tag to a portion in the video stream based on the correlation factor exceeding a correlation threshold value and at least one of the audio confidence score exceeding an audio threshold value and the video confidence score exceeding a video threshold value.

18 Claims, 6 Drawing Sheets

(51) Int. Cl.
 *G06K 9/00* (2006.01)
 *G06F 40/30* (2020.01)

(56) References Cited

U.S. PATENT DOCUMENTS

| | | |
|---|---|---|
| 8,768,693 B2 | 7/2014 | Somekh et al. |
| 9,338,420 B2 | 5/2016 | Xiang |
| 9,547,712 B2 | 1/2017 | Kraley |
| 2002/0135618 A1* | 9/2002 | Maes ............... G06F 3/0481 |
| | | 715/767 |
| 2007/0106660 A1 | 5/2007 | Stern et al. |
| 2008/0263583 A1* | 10/2008 | Heath ............... G06Q 30/02 |
| | | 725/32 |
| 2013/0346068 A1 | 12/2013 | Solem et al. |
| 2014/0029916 A1 | 1/2014 | Dhawan et al. |
| 2014/0164927 A1 | 6/2014 | Salaverry et al. |
| 2014/0181668 A1* | 6/2014 | Kritt ............... G06F 3/0484 |
| | | 715/719 |
| 2015/0100578 A1* | 4/2015 | Rosen ............. G06F 17/2247 |
| | | 707/737 |
| 2015/0248798 A1* | 9/2015 | Howe ............. G07C 9/00158 |
| | | 340/5.83 |
| 2016/0071024 A1* | 3/2016 | Amer ............... G06N 7/005 |
| | | 706/12 |
| 2017/0329760 A1* | 11/2017 | Rachevsky ......... G06F 17/271 |
| 2018/0300555 A1* | 10/2018 | Hodge ............. G06K 9/00771 |
| 2019/0043500 A1* | 2/2019 | Malik ............... G10L 15/22 |
| 2019/0087712 A1* | 3/2019 | Sundaresan ........ G06N 3/0454 |

* cited by examiner

CORROBORATING VIDEO DATA WITH AUDIO DATA FROM VIDEO CONTENT TO CREATE SECTION TAGGING

BACKGROUND

The present invention relates generally to tagging video content and, more particularly, to a system and method for corroborating video data with audio data to automatically tag video content.

With the advent of and sharing of live-stream video, user computer devices (e.g., mobile smartphones, tablets, etc.) may be used to record video of an event and may be used to tag specific portions of the video. For example, during a live-stream video recording of a sporting event, the user computer device may tag certain portions of the video recording (e.g., the players at the event) which contains information (e.g., the name of the player) about the video recording. Existing systems either require the user to create singular tags or generate tags that are not always relevant to the consumption of the video content.

SUMMARY

In an aspect of the invention, a computer implemented method includes: receiving, by a computer device, a video stream from a user computer device, the video stream comprising audio data and video data; determining, by the computer device, a candidate audio tag based on analyzing the audio data; establishing, by the computer device, an audio confidence score of the candidate audio tag based on the analyzing of the audio data; determining, by the computer device, a candidate video tag based on analyzing the video data; establishing, by the computer device, a video confidence score of the candidate video tag based on the analyzing of the video data; determining, by the computer device, a correlation factor of the candidate audio tag relative to the candidate video tag; and assigning, by the computer device, a tag to a portion in the video stream based on the correlation factor exceeding a correlation threshold value and at least one of the audio confidence score exceeding an audio threshold value and the video confidence score exceeding a video threshold value.

In another aspect of the invention, a computer program product comprises a computer readable storage medium having program instructions embodied therewith. The program instructions are executable by a computing device to cause the computing device to receive a video stream from a user computer device, the video stream comprising audio data and video data; determine a candidate audio tag based on analyzing the audio data and determine a candidate video tag based on analyzing the video data; establish an audio confidence score of the candidate audio tag based on the analyzing of the audio data and a video confidence score of the candidate video tag based on the analyzing of the video data; determine a correlation factor between the candidate audio tag and the candidate video tag based on the audio confidence score relative to the video confidence score; and assign a tag to a portion in the video stream on the user computer device based on the correlation factor exceeding a correlation threshold value and at least one of the audio confidence score exceeding an audio threshold value and the video confidence score exceeding a video threshold value.

In another aspect of the invention, there is a system for verification of reports from sources. The system includes: a CPU, a computer readable memory and a computer readable storage medium associated with a mobile computer device program instructions to receive a video stream from a user computer device, the video stream comprising audio data and video data; program instructions to determine a candidate audio tag based on analyzing the audio data and upload audio information onto to an ontology database; program instructions to establish an audio confidence score of the candidate audio tag based on the analyzing of the audio data and downloading ontology information from the ontology database; program instructions to determine a candidate audio tag based on analyzing the video data and upload video information onto to an ontology database; program instructions to establish a video confidence score of the candidate video tag based on the analyzing of the video data and downloading ontology information from the ontology database; program instructions to determine a correlation factor of the candidate audio tag and the candidate video tag; and program instructions to assign a tag to a portion in the video stream based on the correlation factor exceeding a correlation threshold value and at least one of the audio confidence score exceeding an audio threshold value and the video confidence score exceeding a video threshold value.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
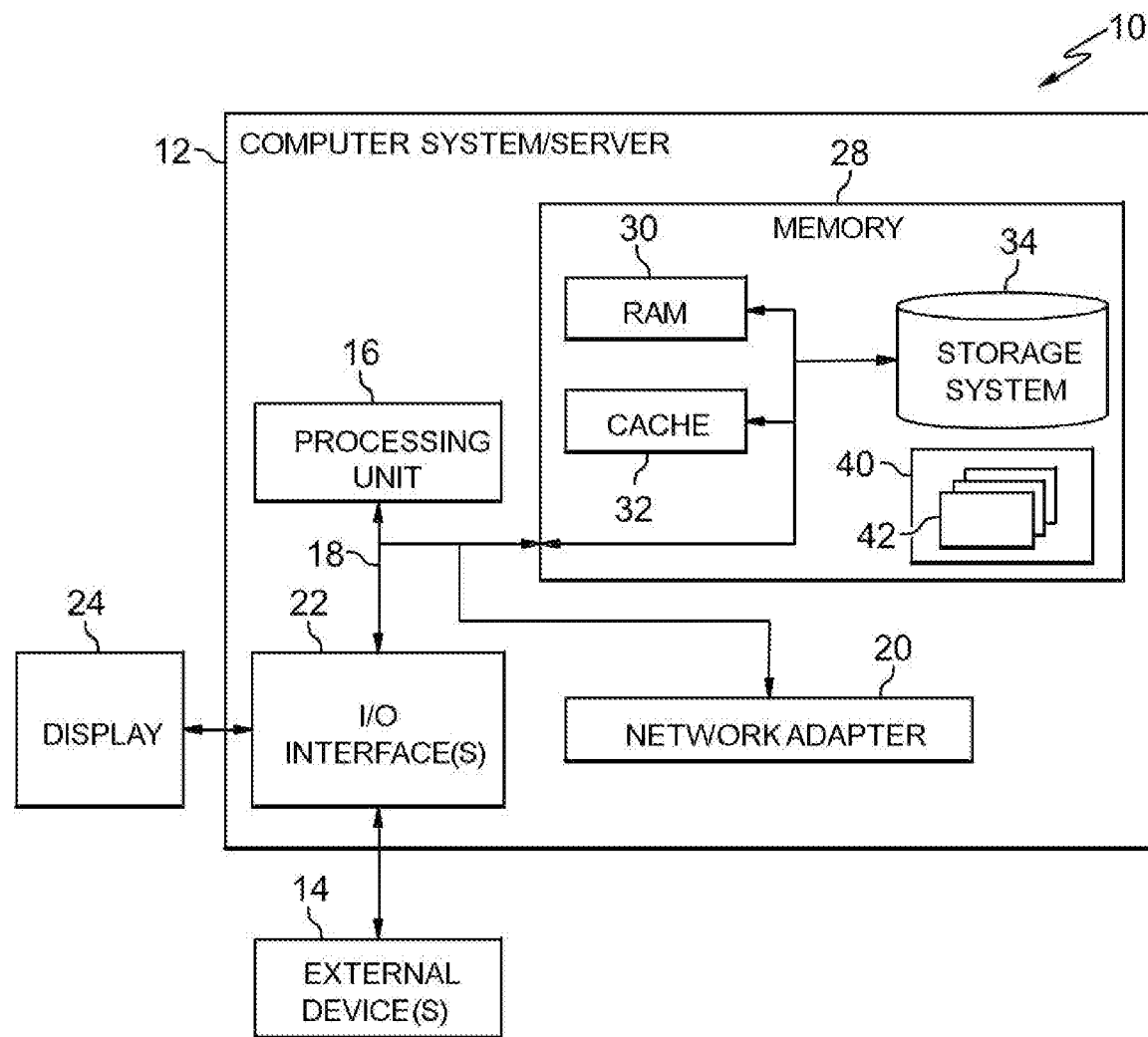
FIG. 1 depicts a computing infrastructure according to an embodiment of the present invention.

The present invention relates generally to tagging video content and, more particularly, to a system and method for corroborating video data with audio data to automatically tag video content. Currently, significant difficulty exists in creating relevant, comprehensive and instantaneous tags for video content (e.g., during live-stream video recordings or previously recorded video content) without manual intervention from a user. Due to the significant quantity of untagged content that may be potentially relevant to the user, technologies that tag video content lack wide-ranging functionality. Aspects of the present invention provide a system for generating tags for video content of a video stream without user intervention.

Aspects of the present invention may process video content to provide comprehensive and instantaneous creation of relevant tags within the video content which will ensure higher level of user engagement during live-stream video recordings or previously recorded video content. Advantageously, the present invention provides a system for generating tags (e.g., segmentation tags or highlighted tags) for video content using natural language understanding (NLU) processing and image recognition processing without user intervention. By using NLU processing in cooperation with image recognition processing, tagging of certain (e.g., relevant) images within the video content during the progression of the video content may be comprehensive and instantaneous.

As described herein, embodiments utilize a correlation factor of the NLU processing relative to the image recognition processing to assign a tag to the video content. For example, as the video content progresses, a video content tagging device continually generates a correlation factor by comparing the NLU processing data for an ontology term and the image recognition data for the ontology term. Once the correlation factor exceeds a correlation threshold value, the video content tagging device assigns the tag in the video content relating to the ontology term.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
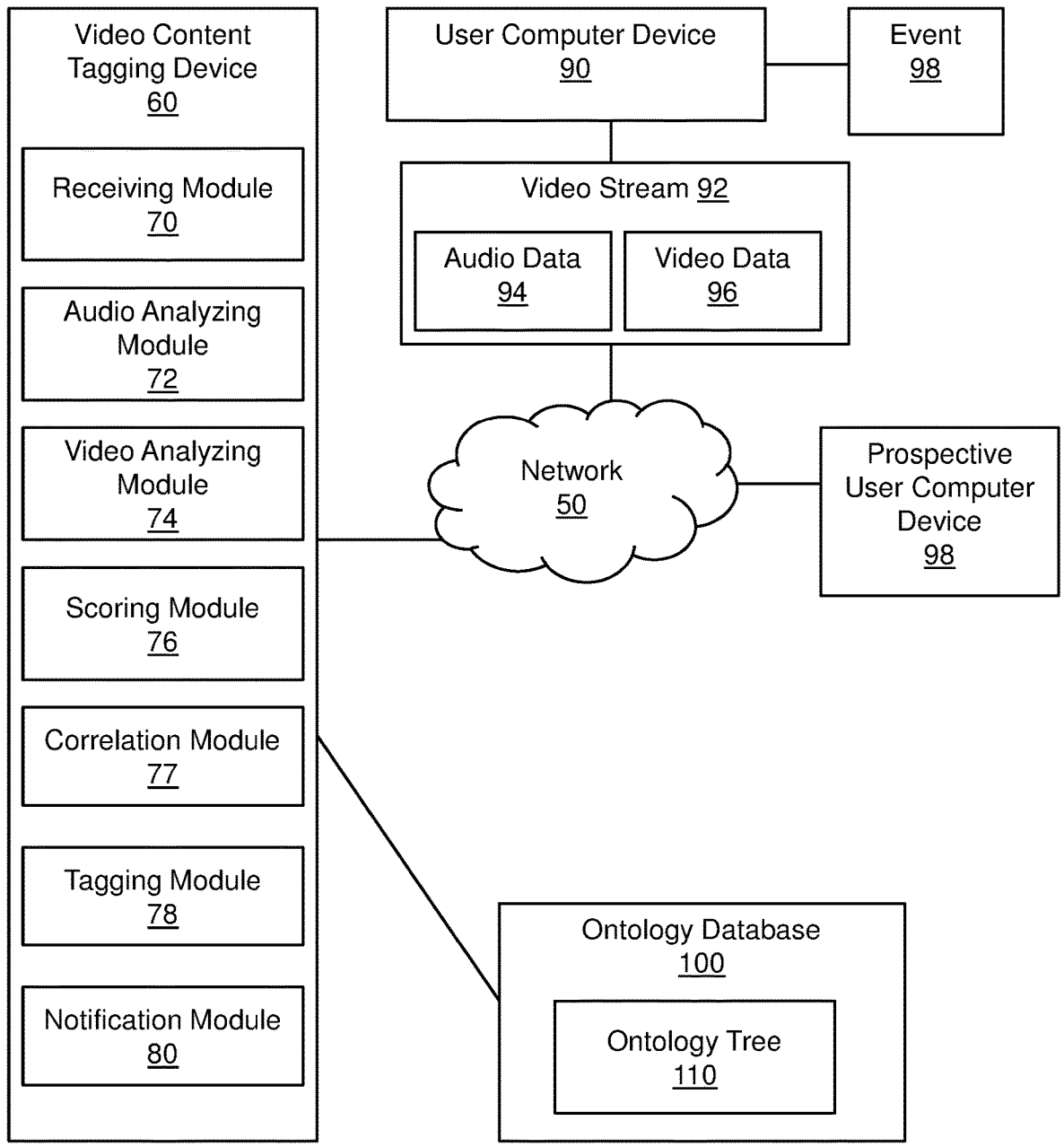
FIG. 2 shows an exemplary environment in accordance with aspects of the invention.

FIG. 2 shows an exemplary environment in accordance with aspects of the invention. In embodiments, the present system uses a confidence score between NLU processing and image recognition processing to assign a tag to video content. For example, as the video content progresses, the video content tagging device continually generates an audio and video confidence score. Once the audio and video confidence score cross their respective threshold values, the video content tagging device assigns the tag to the video content. The video content tagging device de-assigns the tag to the video content when the audio and video confidence score falls below their respective threshold values.

As described herein, assigning the tag refers to the video content refers to highlighting a section of video content based on the NLU processing and the image processing of the video content. For example, assigning may refer to modifying an image of a car in a video image by placing a generic highlight, such as a box, around an image of a car. The assigned or highlighted section of the video content includes information (e.g., data, content information, Hypertext Markup Language HMTL information, etc.) that allows the assigned video content to be searchable, stored, and indexed.

In aspects, de-assigning the tag refers to removing the highlight of a section of video content based on the NLU processing and the image processing of the video content. For example, de-assigning may refer modifying the image of the car in the video image by removing the generic highlight, such as the box, around the image of the car.

The exemplary environment includes a video content tagging device 60 which may comprise a computer system 12 of FIG. 1, and may be connected to a network 50 (e.g., via the network adapter 20 of FIG. 1). The network 50 may be any suitable communication network or combination of networks, such as a local area network (LAN), a general wide area network (WAN), a public network (e.g., the Internet), a 3G network, a Long-Term Evolution (LTE) network, and/or a 5G network.

The video content tagging device 60 may comprise a plurality of modules configured to perform one or more functions described herein. In aspects, the video content tagging device 60 may include additional or fewer modules than those shown in FIG. 2. In aspects, separate components may be integrated into a single computing component or module. Additionally, or alternatively, a single module may be implemented as multiple computing components or modules (e.g., program modules 42 of FIG. 1).

As described herein, the video content tagging device 60 includes a receiving module 70, an audio analyzing module 72, a video analyzing module 74, a scoring module 76, a correlation module 77, a tagging module 78, and a notification module 80. In embodiments, the video content tagging device 60 is configured for communication via the network 50 with an ontology database 100, a user computer device 90, and a prospective user computer device 98. The user computer device 90 and the prospective user computer device 98 may be, for example, personal digital assistants (PDA), cellular telephones, laptop computers, tablet computers, and/or computer systems that may communicate over the network 50.

In embodiments, the ontology database 100 includes an ontology tree 110 which defines a representational foundational connection (e.g., ontologies) between different terms (e.g., nodes) of formal language. Ontologies are available for many concepts and are represented using the Web Ontology Language. Using the ontology database 100, the video content tagging device 60 determines which portions or segments (e.g., cars, truck, flowers, etc.,) in video content to tag.

In aspects, the video content tagging device 60 communicates with the user computer device 90 via the network 50. The user computer device 90 transmits a video stream 92 (e.g., a video recording) of an event 98 (e.g., a car show) to the video content tagging device 60 over the network 50. The video stream 92 includes audio data 94 (e.g., audio data in the video recording of the car show) and video data 96 (e.g., video data in the video recording of the car show) of the event 98 for processing by the video content tagging device 60.

Still referring to FIG. 2, the receiving module 70 in the video content tagging device 60 receives the video stream 92 from the user computer device 90. For example, the receiving module 70 receives the video stream 92 of the car show from the user computer device 90 to be analyzed and tagged.

Based on receiving the video stream 92, the audio analyzing module 72 analyzes the audio data 94 in the video stream 92 using NLU processing. The audio analyzing module 72 determines a candidate audio tag in the video stream 92 based on NLU processing of the audio data 94. In some aspects, the audio analyzing module 72 may determine multiple candidate audio tags in the video stream 92.

In aspects, the audio analyzing module 72 uses the NLU processing and determines that the audio data 94 includes a recitation of a specific type of car. Based on determining that the audio data 94 includes a recitation of the specific type of car, the audio analyzing module 72 determines that the specific type of car is the candidate audio tag in the audio data 94.

For example, the analyzing module 72 uses the NLU processing on the audio data 94 in the video stream 92 to determine that audio data 94 refers to a specific type of car (e.g., a 1976 sedan) and that the 1976 sedan is the candidate audio tag. By way of another example, the analyzing module 72 uses the NLU processing on the audio data 94 in the video stream 92 to determine that audio data 94 refers to multiple types of cars (e.g., a 1976 sedan and a 1970 convertible) and that the 1976 sedan and the 1970 convertible are both candidate audio tags based on NLU processing of the audio data 94.

Based on the audio analyzing module 72 analyzing the audio data 94, the scoring module 76 establishes an audio confidence score of the candidate audio tag in the audio data 94 as a percentage score. In aspects, the audio confidence score may be based on an analysis of the audio data 94 (e.g., the frequency the audio data 94 refers to the candidate audio tag). The percentage scores, as described herein, established by the scoring module 76 are non-limiting examples and other confidence percentage scores may be established. The scoring module 76 continually uses NLU processing and updates the audio confidence score of the candidate audio tag on the audio data 94 as the video stream 92 progresses.

For example, based on the scoring module 76 determining the audio data 94 refers to a 1976 sedan, the audio analyzing module 72 may determine the audio confidence score of the candidate audio tag of the 1976 sedan, as a non-limiting example, is 95% (e.g., the frequency in the audio data 94 that the audio data 94 refers to the 1976 sedan). In another example, based on the scoring module 76 determining the audio data 94 refers to a 1956 sedan, the audio analyzing module 72 may determine the audio confidence score of the candidate audio tag of the 1956 sedan, as a non-limiting example, is 85% (e.g., the frequency in the audio data 94 that the audio data 94 refers to the 1956 sedan). However, based on the scoring module 76 determining the audio data 94 later in the video stream 92 refers to a 1976 sedan, the audio analyzing module 72 may determine the audio confidence score of the candidate audio tag of the 1976 sedan, as a non-limiting example, is 90% (e.g., the frequency in the audio data 94 that the audio data 94 refers to the 1976 sedan).

Based on establishing the audio confidence score for the candidate audio tag, the video analyzing module 74 analyzes the video data 96 using image recognition processing. The video analyzing module 74 determines a candidate video tag in the video stream 92 based on the analysis of the video data 96. In some aspects, the video analyzing module may determine multiple candidate video tags in the video stream.

In aspects, the video analyzing module 74 uses the image recognition processing and determines that the video data 96 includes an image of a specific type of car. Based on determining that the video data 96 includes a image of the specific type of car, the video analyzing module 74 determines that the specific type of car is the candidate video tag in the video data 96.

For example, the video analyzing module 74 uses image recognition processing of the video data 96 to determine that the video data 96 has an image of a specific type of car (e.g., the 1976 sedan). Based on determining that the video data 96 has the image of a specific type of car, the video analyzing module 74 determines that the image of a specific type of car is a candidate video tag (e.g., the 1976 sedan may be determined as the candidate video tag). In aspects, the video analyzing module 74 may determine that the video data 96 has an image of multiple types of cars (e.g., the 1976 sedan and the 1970 convertible) and determines that the video data 96 has multiple candidate video tags (e.g., both the 1976 sedan and the 1970 convertible may be determined as candidate video tags).

In accordance with other aspects, the video analyzing module 74 processes the video stream 92 at a frame rate level (e.g., scanning an index of all frames per second contained in the video stream 92). Specifically, the video analyzing module 74 scans the individual frames (e.g., i-frame) and uses image recognition processing in determining the exact video content in each i-frame. As the number of i-frames processed increases, the certainty of the resulting percentage score of the candidate video tag increases.

Based on the video analyzing module 74 analyzing the video data 96, the scoring module 76 establishes a video confidence score of the candidate video tag in the video data 96 as a percentage score. In aspects, the video confidence score may be based on an analysis of the video data 96 (e.g., the frequency for each i-frame of the video data 96 having an image of the candidate video tag). The percentage scores, as described herein, established by the scoring module 76 are non-limiting examples and other confidence percentage scores may be established. The scoring module 76 continually uses image recognition processing and updates the video confidence score of the candidate video tag on the video data 96 as the video stream 92 progresses.

For example, based on the scoring module 76 determining the video data 96 in the video stream 92 refers to the 1976 sedan, the video analyzing module 74 may determine the video confidence score of the candidate video tag, as a non-limiting example, is 95% (e.g., the frequency for each i-frame of the video data 96 having an image of the 1976 sedan). In another example, based on the scoring module 76 determining that the video data 96 refers to a 1956 sedan, the video analyzing module 74 may determine the video confidence score of the candidate video tag of the 1956 sedan, as a non-limiting example, is 85% (e.g., the frequency for each i-frame of the video data 96 having an image of the 1956 sedan). However, based on the scoring module 76 determining that the video data 96 later in the video stream 92 refers to a 1976 sedan, the video analyzing module 74 may determine the video confidence score of the candidate video tag of the 1976 sedan, as a non-limiting example, is 90% (e.g., the frequency for each i-frame of the video data 96 having an image of the 1976 sedan).

Based on the scoring module 76 establishing the audio confidence score for the candidate audio tag and the video confidence score for the candidate video tag, the correlation module 77 determines a correlation factor between the candidate audio tag and the candidate video tag. The correlation module 77 determines the correlation factor based on the audio confidence score (e.g., via the NLU processing) relative to the video confidence score (e.g., via the image recognition processing) as a percentage score.

For example, based on the audio analyzing module 72 determining the audio confidence score of a 1976 sedan in the video stream 92 is 94% and the video analyzing module 74 determining that the video confidence score of the 1976 sedan in the video stream 92, as a non-limiting example, is 90%, the correlation module 77 may determine the correlation factor between the audio confidence score relative to the video confidence score, as a non-limiting example, is 95%. In another example, based on the audio analyzing module 72 determining the audio confidence score of a 1976 sedan in the video stream 92, as a non-limiting example, is 70% and the video analyzing module 74 determining that the video confidence score of the 1976 sedan in the video stream 92 is 95%, the correlation module 77 may determine the correlation factor determined by the correlation module, as a non-limiting example, is 80%.

In aspects, based on establishing the audio confidence score, establishing the video confidence score and determining the correlation factor, the tagging module 78 of the video content tagging device 60 assigns a tag to a portion or segment in the video stream 92. Specifically, the tagging module 78 tags the portion of the video stream 92 based on the correlation factor exceeding a correlation threshold value, and the audio confidence score exceeding an audio threshold value or the video confidence score exceeding a video threshold value. The audio threshold value, the video threshold value, and the correlation threshold value are predetermined values generated prior to processing by the video content tagging device 60.

For example, the tagging module 78 assigns the tag to the portion of the video stream 92 which has an image of the 1976 sedan based on the correlation factor for the 1976 exceeding a correlation threshold value and the candidate audio tag for the 1976 sedan exceeding the audio threshold value or the candidate video tag for the 1976 exceeding the video threshold value. By way of another example, the tagging module 78 assigns tags to multiple portions (e.g., the 1976 sedan and a 1970 convertible) of the video stream 92 based on the correlation factor for the multiple candidate portions exceeding their respective correlation threshold values and the multiple candidate audio tags exceeding their respective audio threshold values, or the multiple candidate video tags exceeding their respective video threshold values.

In accordance with other aspects, the tagging module 78 de-assigns the tag to the portion in the video stream 92 based on the audio confidence score falling below the audio confidence threshold value, the video confidence score falling below the video confidence threshold value while the correlation factor experiences a delta (e.g., change) in the audio confidence score relative to the video confidence score. For example, when the audio confidence score of the 1976 sedan falls below the audio threshold value, the video confidence score of the 1976 sedan falls below the audio threshold value while the correlation factor of the audio confidence score of the 1976 sedan relative to the video confidence score of the 1976 sedan changes dramatically (e.g., delta), the tagging module 78 closes the tag to the 1976 sedan on the video stream 92.

Based on the tagging module 78 assigning the tag to the portion in the video stream 92, the notification module 80 may notify the prospective user computer device 98 that the tag has been assigned to the video stream 92. The prospective user computer device 98 and other user devices (e.g., via the network 50) may be informed by the notification module 80 that the tag has been assigned. In aspects, a prospective user may select notification options on the prospective user computer device 98 based on content on the video stream 92 being posted on websites.

For example, notification options are selected by the prospective user of the prospective user computer device 98 in order for the prospective user to be alerted when tags relevant to the prospective user are assigned to the video stream 92 and posted on a website. In particular, the prospective user computer device 98 may receive an automatic notification at the time of a broadcast of a particular tag during the event 98 for topics that are relevant to the prospective user.

To avoid overwhelming the prospective user computer device 98, the notification module 80 analyses the tag assigned by the tagging module 78 using natural language processing (NLP). Based on the context of key words on the tag, the notification module 80 applies ontology-based algorithms on the data and metadata of the tag to find the appropriate semantical closest meaning to the keyword of the tag. In aspects, the ontology-based algorithms refer to NLP algorithms applied to an object ontology as described with reference to the ontology tree of the ontology database 100. By using the ontology-based algorithms, the prospective user computer device 98 will receive notifications that are relevant to the prospective user and not receive notifications that are not relevant to the prospective user.

Based on prospective user selecting the notifications options on the prospective user computer device 98 and the notification module 80 applying the ontology-based algorithms on the tag assigned by the tagging module 78, the prospective user computer device 98 will receive automatic notifications from the notification module 80 without the need for the prospective user to declare the precise scope of the notification. In other aspects, the prospective user computer device 98 may receive the notification time of the tag and may receive the video stream 92 starting from the specific moment the tagging module assigns the tag to the video stream 92.

For example, based on the tagging module 78 assigning a tag (e.g., a tag to a 1976 sedan at a car event) to the video stream 92 at a certain time in the video stream 92 and the video stream 92 being posted on a website, the prospective user computer device 98 will receive a notification from the notification module 80 that the tagging module 78 has assigned the tag to the 1976 sedan at the car event. The prospective user computer device 98 may also receive the time the tagging module 78 assigned the tag for the 1976 sedan, and receive the video stream 92 of the car event starting at the certain time in which the tagging module 78 assigned the tag for the 1976 sedan.

In other aspects, the prospective user computer device 98 may not receive a notification from the notification module 80 when the tagging module 78 assigns a tag to 1960 truck at the car event, but may receive a notification when the tagging module 78 assigns a tag to a 1977 sedan at the car event. In yet other aspects, based selecting a notification option of receiving notifications when tag occurs only for the 1976 sedan, the user computer device 90 will receive a notification from the notification module 80 when the 1976 sedan is tagged and not when a 1970 sedan is tagged.

In aspects, to avoid overwhelming the processing system of the user computer device 90, the notification module 80 may apply notification algorithms to the video stream 92 in order to find the appropriate semantical closest meaning to the user input of the notification options. The notification algorithms may be defined as ontology matching algorithms that use ontology based meaning of NLU processing and image recognition processing to determine the appropriate semantical closest meaning to the user input. In this manner, based on the context of the keyword inputted by the user, the user computer device 90 receives only notifications for interested topics.

Figure 3:
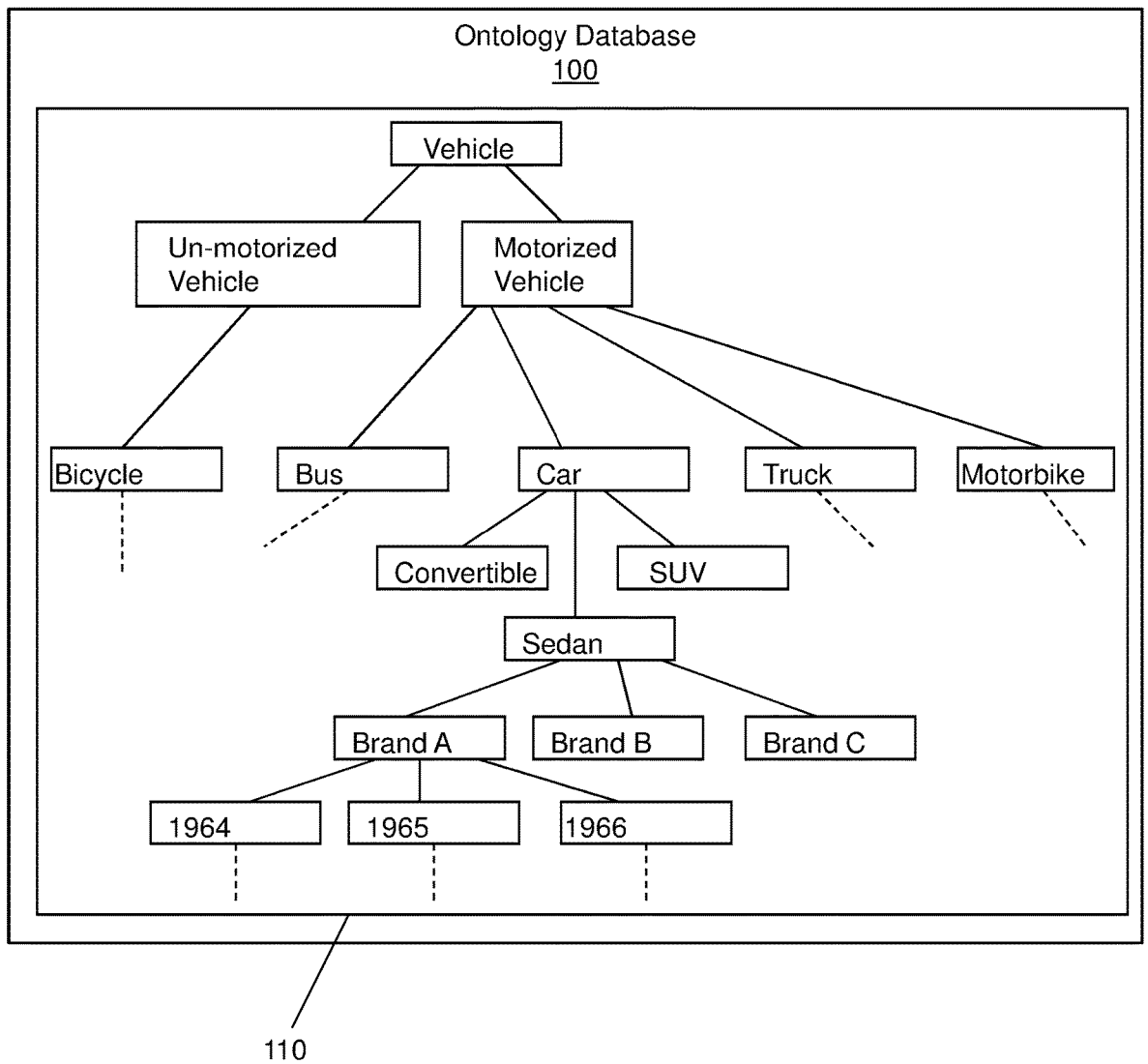
FIG. 3 depicts an exemplary ontology database in accordance with aspects of the invention.

FIG. 3 depicts an exemplary ontology database 100 in accordance with aspects of the invention. The ontology database 100 includes the ontology tree 110 for terms of formal language, and defines the foundational connection between different terms of formal language. By way of example, the ontology tree 110 represents a hierarchal presentation of semantical concepts with a parent node (e.g., a generalized concept) compared to a child node (e.g., a specified concept). Each node (e.g., child and parent) has a lengthy textual description defining the precise meaning and additional structured attributes of the node such as data type, length, related concepts to the node, previous versions of the concepts of the node, etc.

As described herein, FIG. 3 illustrates the ontology tree 110 as a graph of formal language which utilizes nodes to connect the individual terms of the formal language with solid or dashed lines. Every node of this graph stands for a concept which may be correspond to words or short phrases (e.g., noun or noun phrases). A solid line connecting two nodes represents an actual foundation connection of the formal language terms that have determined. The dotted line represents a possible foundational connection from a known node to unknown node(s).

For example, the ontology database 100 of FIG. 3 illustrates an ontology tree 110 for a vehicle. The vehicle node has a foundational connection to an un-motorized vehicle node and a motorized vehicle node. The un-motorized vehicle node has a foundational connection to a bicycle node. The bicycle node has a possible foundation connection (e.g., dotted line) to unknown nodes.

Still referring to FIG. 3, the motorized vehicle node has a foundation connection to a bus node, a car node, a truck node, and a motorbike node. The car node has a foundational connection to a convertible node, a sedan node, and to sports utility vehicle (SUV) node. The sedan node has a foundational connection to a Brand A node, a Brand B node, and a Brand C node. The Brand A node has a foundation connection to a 1964 year node, 1965 year node, and a 1966 year node. In aspects, the bus node, the truck node, the motorbike node, the 1964 year node, the 1965 year node, and the 1966 year node has a possible foundation connection (e.g., dotted line) to an unknown nodes.

In aspects, some of the modules (e.g., the audio analyzing module 72, the video analyzing module 74, and the scoring module 76) in the video content tagging device 60 connect to the ontology database 100 and upload information (e.g., metadata, data, etc.,) to the ontology database 100 to create the ontology tree 110 and download information from the ontology database 100 to perform the action of the module. The audio analyzing module 72 performs analysis of the audio data 94 by using NLU processing on the audio data 94 and uploads audio information (e.g., metadata and the audio data 94) to generate the individual nodes in the ontology tree 110. The video analyzing module 74 performs analysis of the video data 96 by using image recognition processing on the video data 96 and uploads video information (e.g., metadata and the video data 96) to generate video information for individual nodes in the ontology tree 110.

In other aspects, the scoring module 76 and the correlation module 77 download ontology information (e.g., ontology data) from the ontology database 100 about individual nodes in the ontology tree 110. The scoring module 76 uses the ontology information from the ontology database 100 to establish the audio confidence score and the video confidence score for the individual nodes of the ontology tree 110. The correlation module 77 uses the ontology information from the ontology database 100 to determine the correlation factor for the individual nodes of the ontology tree 110.

Figure 4:
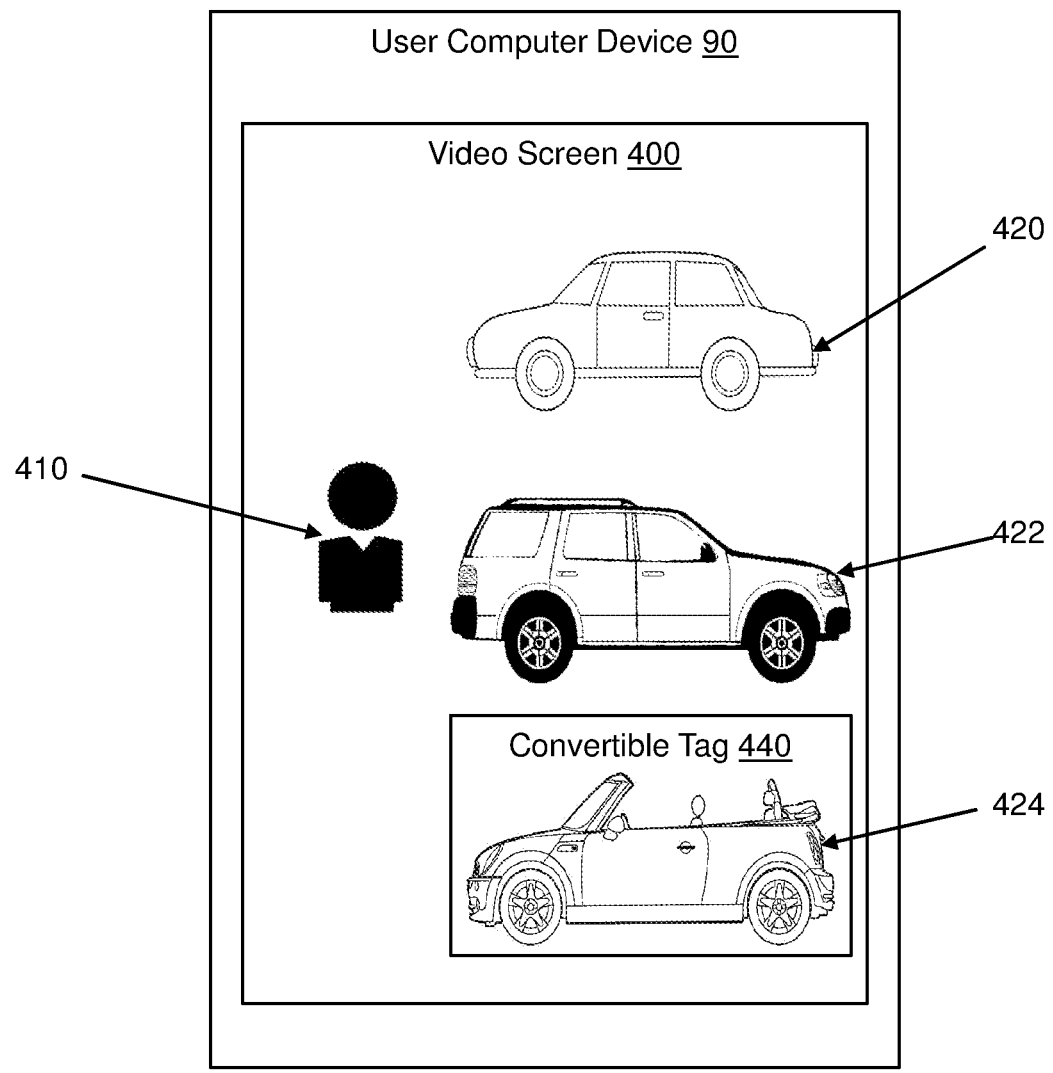
FIG. 4 shows an exemplary use in accordance with aspects of the invention.
Figure 5:
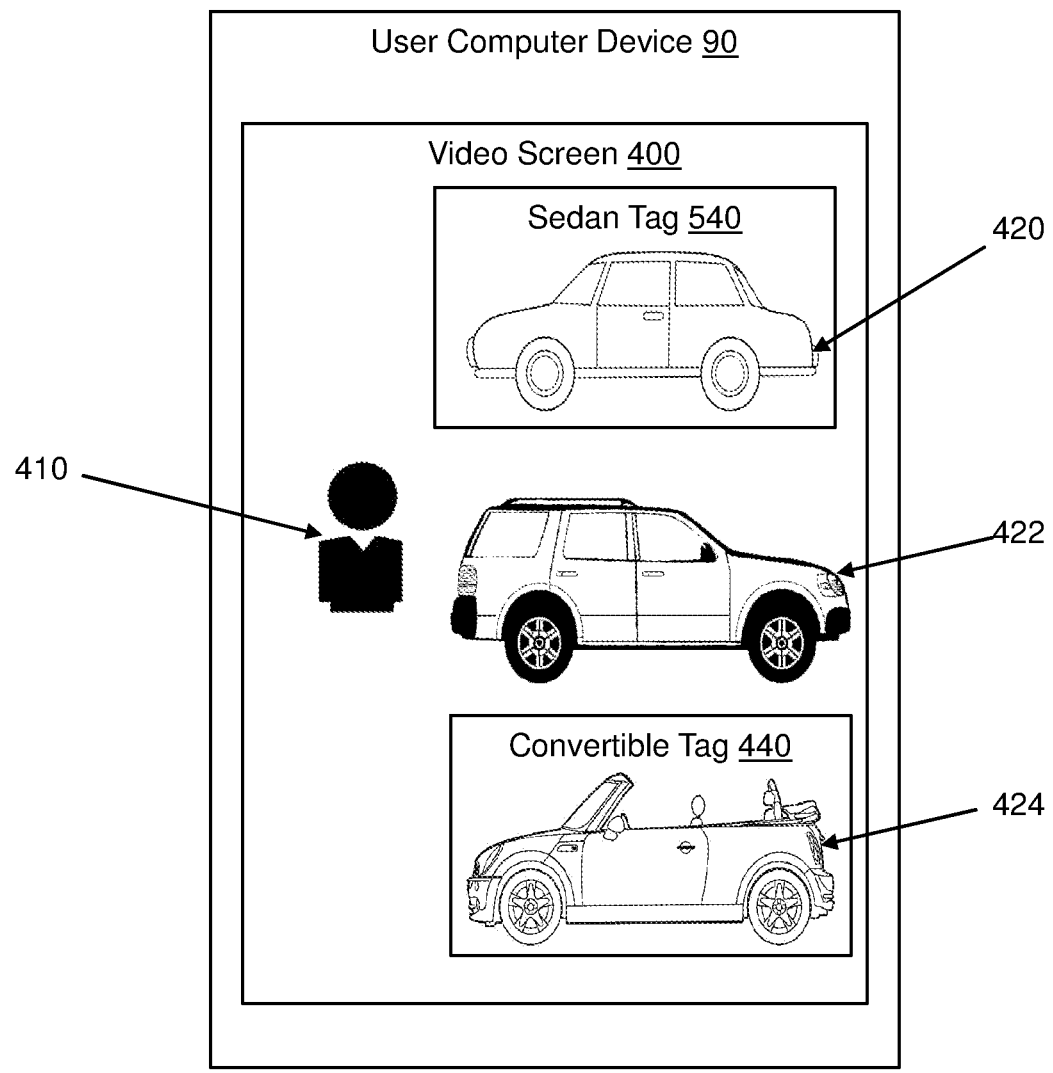
FIG. 5 shows another exemplary use in accordance with aspects of the invention.

FIGS. 4-5 show an exemplary use in accordance with aspects of the invention. Referring to FIG. 4, the user computer device 90 live streams a car show which includes multiple types of cars (e.g., a convertible 424, a SUV 422 and a sedan 420). On the video screen 400 (e.g., an individual frame of the video stream 92) of the user computer device 90, there is an image of an individual 410 (e.g., an image of a celebrity or a friend) who may narrate about the cars at the car show. On approaching the cars in the car show, the individual 410 begins narrating features of the cars or anecdotes about the cars (e.g., the year and make of the cars).

In aspects, a car ontology is established based on the narration of the individual, individual interest, or existing metadata. As the individual continues to narrate about the car, the video content tagging system defines the confidence in the individual's speech patterns relevant to the car and assigns a tag to the video content for the 1976 car when the confidence exceeds a threshold value.

As described herein, the video content tagging device 60 receives the video stream 92 of the narration by the individual 410 of the cars. Upon reception and analysis of the audio data 94 and the video data 96 in the video stream 92, the audio analyzing module 72 and the video analyzing module 74 uploads information to an ontology database 100. Running in the background, the ontology database 100 generates a car ontology which includes, but is not limited to, the type of the car, the brand of the car, the year of the car, etc.

As the individual 410 continues to narrate about a specific type of car, such as the convertible 424, the audio analyzing module 72 and the video analyzing module 74 creates the candidate audio tag and the candidate video tag for the convertible 424. The scoring module 76 establishes an audio confidence score (e.g., variable S) and a video confidence score (e.g. variable I) for the convertible 424.

Additionally, the scoring module 76 marks two time variables: timeS (TS) which represents the first instance of NLU processing of the audio data 94 for convertible 424, and timeI (TI) which represents the first instance of image recognition processing of the video data 96 for the convertible 424. The correlation module 77 determines the correlation factor (e.g., variable C) for the convertible 424.

Each variable (e.g., S, I, and C) has a respective confidence threshold value (e.g., audio confidence threshold value (TS), video confidence threshold value (TI), and correlation threshold value (TC) for the convertible 424). The tagging module 78 assigns a convertible tag 440 for the convertible 424 according to equation 1:

if $\{C \geq TC \&\& S \geq TS\}$ OR if $\{C \geq TC \&\& I \geq TI\}$ =>assign tag at MIN(timeS,timeI).

Equation 1 describes that based on the correlation factor (C) exceeding the correlation threshold value (TC), and the audio confidence score (S) exceeding the audio confidence threshold value (TS) or the video confidence score (I) exceeding the video confidence threshold value (TI), the tagging module 78 assigns the tag for the particular portion of the video content in the video stream 92 at the earliest timeS or timeI. For example, the tagging module 78 assigns the convertible tag 440 for the convertible 424 based on the correlation factor (C) for the convertible 424 exceeding the correlation threshold value (TC) and the audio confidence score (S) or the video confidence score (I) for the convertible 424 exceeding their respective threshold value (e.g., TS or TI). The time in which tagging module 78 assigns the convertible tag 440 at the instance when either the audio confidence score (S) or the video confidence score (I) exceed their respective threshold value, TS or TI, whichever is earliest.

In aspects, the convertible tag 440 remains assigned as long the audio confidence score (S) for the convertible 424 exceeds the audio confidence threshold value (TS) or the video confidence score (I) for the convertible 424 exceeds the video confidence threshold value (TS). For example, during the interruption, the narrating individual may refer to the convertible 424 by a nickname. In this case, the tagging module continues to assign the tag to the convertible 424 as the narrating individual continues to narrate about the convertible 424 by the nickname.

For example, based on the audio confidence score (S) of the convertible 424 falling below the audio confidence threshold value (TS) and the video confidence score (I) of the convertible 424 falling below the video confidence threshold value (TI) while the correlation factor (C) experiences a delta (e.g., a change in the audio confidence score (S) relative to the video confidence score (I) of the convertible 424), the tagging module 78 de-assigns the convertible tag 440 at the last of time EndS or EndI. In aspects, the tagging module saves the assignment time and the de-assignment time of the convertible tag 440 for the convertible 424.

Referring to FIG. 5, during the middle of the narration of the car show, another individual approaches the individual 410 performing the narration in mid-sentence. Due to the interruption by the other individual, the individual 410 stops narrating about the convertible 424 and responds to the other individual.

By way of example, based on the individual 410 continuing to narrate about cars at the car show and the audio confidence score (S) for the convertible 424 exceeding the audio confidence threshold value (TS) or the video confidence score (I) for the convertible 424 exceeding the video confidence threshold value (TS), the tagging module 78 may continue to assign the tag to the convertible tag 440. By way of another example, based the individual 410 narrating about other types of cars (e.g., a sedan 420) at the car show after the interruption, the tagging module 78 may de-assign the convertible tag 440 and may assign a sedan tag 540 for sedan 420. By way of yet another example, based on the individual 410 narrating about all types of cars (e.g., the convertible 424 and the sedan 420) at the car show after the interruption, the tagging module 78 may continue to assign the convertible tag 440 and, in addition, may assign a sedan tag 540.

Figure 6:
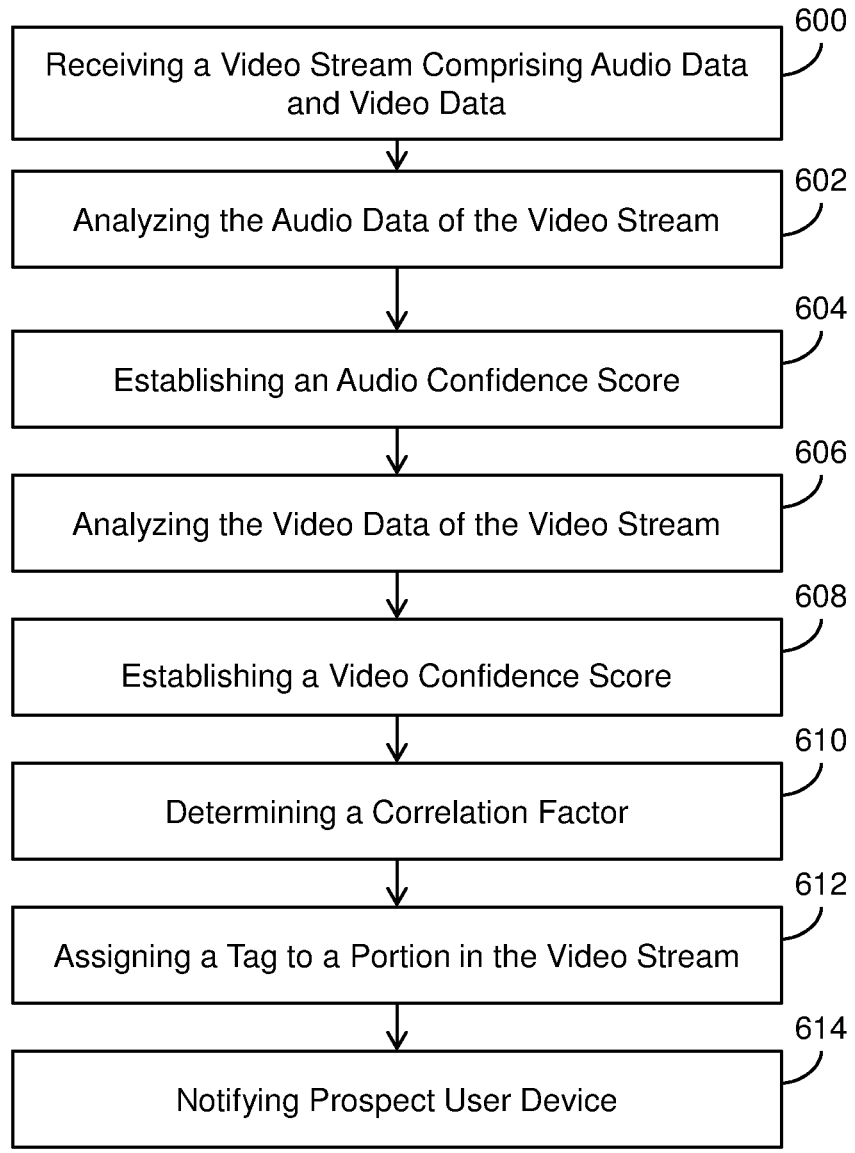
FIG. 6 illustrates a flowchart of steps of a method in accordance with aspects of the invention.

FIG. 6 illustrates a flowchart of steps of a method in accordance with aspects of the invention. At step 600, the video content tagging device 60 receives a video stream 92 from the user computer device 90. In aspects, the video stream 92 is about an event 98. For example, as described with respect to FIG. 2, the receiving module 70 receives live-stream recording of a car event from the user computer device 90.

At step 602, the video content tagging device 60 analyzes the audio data 94 in the video stream 92 received from the user computer device 90. In aspects, based on receiving the video stream 92 from the user computer device 90 at step 600, the audio analyzing module 72 analyzes the audio data 94 of the video stream 92 to determine a candidate audio tag in the video stream 92.

For example, as described with reference to FIG. 2, the audio analyzing module 72 analyzes the live-stream recording video of the car event to determine candidate audio tags for specific types of cars (e.g., sport utility vehicles, sedans, convertibles, etc.) which are at the car event or other relevant objects at the car event. The audio analyzing module 72 analyses the live-stream recording of the car event by using NLU processing on the audio data 94 of the live-stream recording.

At step 604, the video content tagging device 60 establishes an audio confidence score of the candidate audio tag in the audio data 94 received from the user computer device 90. In aspects, based on analyzing the audio data 94 in the video stream 92 at step 602, the scoring module 76 establishes the audio confidence score of the candidate audio tag in the audio data 94 received from the user computer device 90.

For example, as described with reference to FIG. 2, the scoring module 76 establishes the audio confidence score of the specific types of cars at the car event based on the analysis of the video data 96 of the video stream 92. The scoring module 76 uses NLU processing and updates the audio confidence score of the candidate audio tag as the video stream 92 progresses.

At step 606, the video content tagging device 60 analyzes the video data 96 in the video stream 92 received from the user computer device 90. In aspects, based on establishing the audio confidence score of the candidate audio tag in the audio data 94 at step 604, the video analyzing module 74 analyzes the video data 96 of the video stream 92 to determine a candidate video tag in the video stream 92.

For example, as described with reference to FIG. 2, the video analyzing module 74 analyzes the live-stream recording of the car event to determine candidate video tags for specific types of cars (e.g., sport utility vehicles, sedans, convertibles, etc.) which are at the car event. The video analyzing module 74 analyses the live-stream recording of the car event by using image recognition processing on the video data 96 of the live-stream recording.

At step 608, the video content tagging device 60 establishes a video confidence score of the candidate video tag in the video data 96 received from the user computer device 90. In aspects, based on analyzing the video data 96 in the video stream 92 at step 606, the scoring module 76 establishes the video confidence score of the candidate video tag in the video data 96 received from the user computer device 90.

For example, as described with reference to FIG. 2, the scoring module 76 establishes the video confidence score of the specific types of cars at the car event based on the analysis of the video data 96 of the video stream 92. The scoring module 76 uses image recognition processing and updates the video confidence score of the candidate video tag as the video stream 92 progresses.

At step 610, the video content tagging device 60 determines a correlation factor between the candidate audio tag and the video audio tag. In aspects, based on establishing the audio confidence score of the candidate audio tag at step 604 and the establishing the video confidence score of the candidate audio tag at step 608, the correlation module determines a correlation factor. For example, based on the audio confidence score the specific types of cars being high percentage value and the video confidence score of the specific types of cars being high percentage value, the correlation factor for the specific types of cars may be a high percentage value.

At step 612, the video content tagging device 60 assigns a tag to a portion in the video stream 92 received from the user computer device 90. In aspects, based on establishing the audio confidence score at step 604, establishing the video confidence score at step 608, and determining the correlation factor at 610, the tagging module 78 assigns the tag to the portion in the video stream 92.

In aspects, the tagging module 78 assigns the tag based on the correlation factor exceeding a correlation threshold value, and the audio confidence score exceeding an audio threshold value or the video confidence score exceeding a video threshold value. The tagging module 78 assigns the tag to the portion in the video stream 92 in which the candidate audio tag and the candidate video tag has been established. For example, as described with reference to FIG. 2, based on the correlation factor exceeding the correlation threshold value for a specific type of car, and the audio confidence score exceeding the audio threshold value for the specific type of car or the video confidence score exceeding the video threshold value for the specific type, the tagging module 78 assigns a tag to the specific type of car (e.g., sport utility vehicles, sedans, convertibles, etc.) in the video stream 92.

At step 614, the video content tagging device 60 notifies the prospective user device 98 that the tagging module 78 assigned a tag to the video stream 92. In aspects, based on the tagging module 78 assigning the tag and the video being posted on a website, the notification module 80 notifies the prospective user computer device 98. For example, based on the tagging module 78 assigning a tag to a specific type of car, the prospective user computer device 98 may receive a notification from the notification module 80 that the tagging module 78 has assigned the tag to the specific type of car. In other aspects, the prospective user computer device 98 may receive the notification time of the tag of the specific type of car and may receive the video stream 92 starting from the specific moment the tagging module assigns the tag to the specific type of car in the video stream 92.

In embodiments, a service provider could offer to perform the processes described herein. In this case, the service provider can create, maintain, deploy, support, etc., the computer infrastructure that performs the process steps of the invention for one or more customers. These customers may be, for example, any business that requires mobile device security. In return, the service provider can receive payment from the customer(s) under a subscription and/or fee agreement and/or the service provider can receive payment from the sale of advertising content to one or more third parties.

In still another embodiment, the invention provides a computer-implemented method. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments.

What is claimed is:

1. A computer-implemented method, comprising:
receiving, by a computer device, a video stream from a user computer device, the video stream comprising audio data and video data;
determining, by the computer device, a candidate audio tag based on analyzing the audio data;
establishing, by the computer device, an audio confidence score of the candidate audio tag based on the analyzing of the audio data;
determining, by the computer device, a candidate video tag based on analyzing the video data;
establishing, by the computer device, a video confidence score of the candidate video tag based on the analyzing of the video data;
determining, by the computer device, a correlation factor of the candidate audio tag relative to the candidate video tag;
assigning, by the computer device, a tag to a portion in the video stream based on the correlation factor exceeding a correlation threshold value and at least one of the audio confidence score exceeding an audio threshold value and the video confidence score exceeding a video threshold value; and
de-assigning the tag to the portion in the video stream based on the audio confidence score falling below the audio threshold value, the video confidence score falling below the video threshold value, and a correlation factor experiencing a delta.

2. The method of claim 1, further comprising establishing the audio confidence score of the audio data based on natural language understanding (NLU) processing of the audio data in the video stream.

3. The method of claim 2, further comprising continually updating the audio confidence score using the NLU processing of the audio data.

4. The method of claim 1, further comprising establishing the video confidence score of the video data based on image recognition processing of the video data in the video stream.

5. The method of claim 4, further comprising continually updating the video confidence score using the image recognition processing of the video data.

6. The method of claim 1, wherein the analyzing the audio data comprises determining multiple candidate audio tags.

7. The method of claim 1, wherein the analyzing the video data comprises determining multiple candidate video tags.

8. The method of claim 1, wherein analyzing the video data comprises processing the video stream at a frame rate level.

9. The method of claim 1, further comprising assigning multiple tags to the video stream.

10. The method of claim 1, further comprising notifying a prospective user computer device that the tag has been assigned in the video stream.

11. The method of claim 10, wherein the user computer device receives the notification at a time of a broadcast of the tag.

12. A computer program product comprising a computer readable storage medium having program instructions embodied therewith, the program instructions executable by a computer device to cause the computer device to:

receive a video stream from a user computer device, the video stream comprising audio data and video data;
determine a candidate audio tag based on analyzing the audio data and determine a candidate video tag based on analyzing the video data;
establish an audio confidence score of the candidate audio tag based on the analyzing of the audio data and a video confidence score of the candidate video tag based on the analyzing of the video data;
determine a correlation factor between the candidate audio tag and the candidate video tag based on the audio confidence score relative to the video confidence score; and
assign a tag to a portion in the video stream on the user computer device based on the correlation factor exceeding a correlation threshold value and at least one of the audio confidence score exceeding an audio threshold value and the video confidence score exceeding a video threshold value,
wherein the analyzing of the audio data comprises uploading audio information onto to an ontology database.

13. The computer program product of claim 12, wherein the analyzing of the video data comprises uploading video information onto to an ontology database.

14. The computer program product of claim 13, further comprising establishing the video confidence score and the audio confidence score based on ontology information downloaded from the ontology database.

15. The computer program product of claim 14, further comprising determining the correlation factor based on information downloaded from the ontology database.

16. A system comprising:
a CPU and a computer readable storage medium for storing program instructions which, when executed by the CPU, cause the system to:
receive a video stream from a user computer device, the video stream comprising audio data and video data;
determine a candidate audio tag based on analyzing the audio data and upload audio information onto to an ontology database;
establish an audio confidence score of the candidate audio tag based on the analyzing of the audio data and downloading ontology information from the ontology database;
determine a candidate audio tag based on analyzing the video data and upload video information onto to an ontology database;
establish a video confidence score of the candidate video tag based on the analyzing of the video data and downloading ontology information from the ontology database;
determine a correlation factor of the candidate audio tag and the candidate video tag; and
assign a tag to a portion in the video stream based on the correlation factor exceeding a correlation threshold value and at least one of the audio confidence score exceeding an audio threshold value and the video confidence score exceeding a video threshold value.

17. The system of claim 16, wherein the ontology database generates an ontology of the audio data.

18. The system of claim 16, further comprising determining the correlation factor based on ontology information downloaded from the ontology database.

* * * * *